United States Patent Office 3,310,921
Patented Mar. 28, 1967

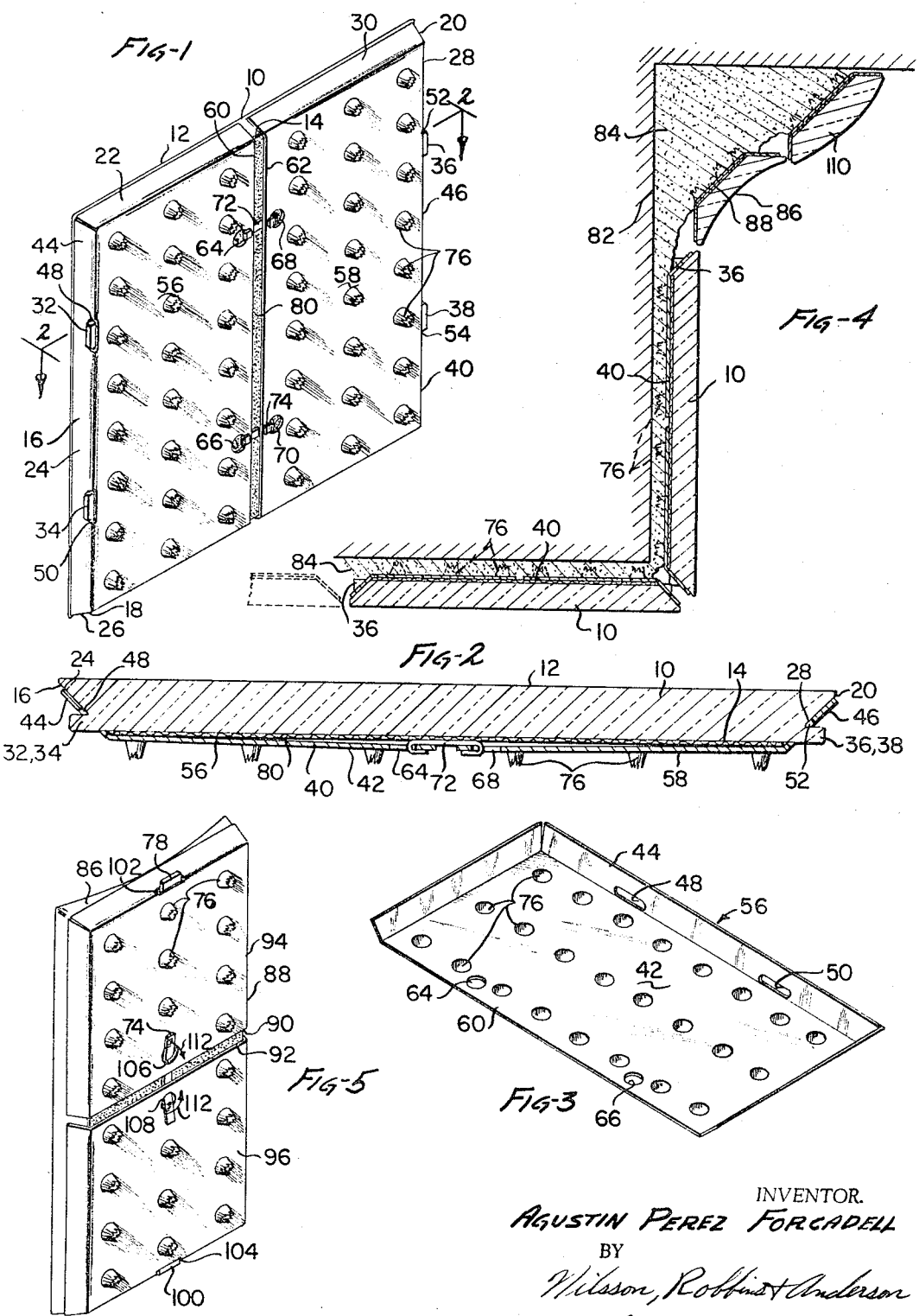

3,310,921
GLASS TILE SYSTEM
Agustin Perez Forcadell, 616 S. Electric Ave.,
Alhambra, Calif. 91803
Filed June 1, 1964, Ser. No. 371,268
11 Claims. (Cl. 52—391)

This invention relates generally to mosaic type tiles and more particularly to such tiles which are vitrified and are, hereinafter, referred to generally as glass tiles. These tiles are of the character typically used for decorative or protective facing of, for example, a wall or floor surface. Still more specifically, the invention concerns such tiles in combination with structure for their attachment to such supporting surfaces.

The practice of facing a surface with tiles, particularly ceramic tiles, has been practiced for centuries because of the decorative and protective merits of ceramic materials and because of their relative permanence. In recent years the practice has come particularly widely into vogue, and is presently being used very widely throughout the building industry.

Such tiles have many appealing qualities, as compared to non-ceramic facing materials; however, they suffer from a number of disadvantages when compared to vitreous or glassy phase materials. For example, non-vitreous tiles are relatively weak and they are inherently opaque thereby precluding any translucence or qualities of depth of color. In addition, non-vitreous tiles are porous and, even if surface glazed, they at best remain somewhat vulnerable to impregnation of moisture and stains and other contaminants through their non-glazed or imperfectly glazed surfaces. These disadvantages severely limit their usefulness in underwater applications, freezing environments where absorbed water causes breakage, hospitals and kitchens where the porous material constitutes an unsanitary harbor for soil and harmful micro-organisms, and in many other applications where their porosity causes them to be difficult to clean such as in pool or shower areas where algae, molds, or soap tend to accumulate.

Vitrified or glass tiles, on the other hand, are relatively very strong and permanent both as to structural integrity as well as to color fastnes. Furthermore, in regard to their colors, glass tiles can be readily manufactured in an infinite variety of colors and hues with any desired degree of transparency or translucence. In addition, glass tiles may be surface embossed or etched or cut, or otherwise sculptured for additional versatility of design. Their non-porous character, regardless of such surface treatments, permits their use in pool, shower, fountain, hospital and kitchen areas where ability to clean hygienically and to clean easily is of vital concern. Furthermore, the non-porous surface of the glass minimizes the clinging thereto, and the accumulation thereon of such foreign matter in the first plate.

Unfortunately however, some of the very qualities of glass tiles which make them otherwise meritorious for use have heretofore caused them to be troublesome and impracticable. For example, their glassy phase, impervious nature causes considerable difficulty in adhering them to their supporting surface since adhesive cement or mortar cannot generally permanently grip the glass.

Attempts in the past to develop techniques for securing glass tiles to their supporting surfaces have typically been directed toward elaborate or intricate bracket mechanisms which are first attached to the supporting surface and then to the tile. Not only are such bracket systems unwieldy in use, but they require extensive additional costs for materials and labor. Furthermore, such bracket systems generally are not adaptable for permitting the replacement of single broken tiles in any simple and inexpensive manner.

It is therefore an object of the present invention to provide a combined glass tile and mounting structure which is not subject to these and other disadvantages of the prior art.

It is another object to provide such a glass tile system which permits inexpensive and versatile installation of glass tile facing to a supporting surface.

It is another object to provide such a glass tile system which exhibits the advantages of glass tiles indicated above without suffering the mounting difficulties of the prior art.

Briefly, these and other objects are achieved in accordance with the structural features of one example of the invention in which a square, glass tile is provided with edges which are beveled toward its rear surface so that, in effect, the front surface or face is undercut by the beveled edges. The side edges of the tile each are provided with a pair of small holding tabs formed integrally with the body of the glass tile and which extend coplanarly with the rear surface of the tile into the undercut region behind the peripheral portions of the tile face.

The holding tabs are engaged by a divided, pan-shaped bracket which receives the rear and edge portions of the tile leaving its front surface exposed. The bracket is divided to form two mirror image halves about a centerline of the tile parallel to the sides thereof. The periphery of the combined bracket comprises forwardly extending side members which approximately conform to the rear portions of the beveled tile edge, but which stop short of its front face, and are not normally visible therefrom.

Those side members of the bracket which are parallel to the line of symmetry between the bracket halves are foraminated or slotted in a manner to receive the holding tabs on the glass tile when the bracket halves are juxtaposed over the rear surfaces of the tile, and moved laterally toward each other. To secure the two halves next to each other in a manner to grip and hold the tile by its holding tabs, the contiguously disposed edges of the bracket halves along the line of symmetry are also formainated to provide openings in mirrored disposition along either side of the line of symmetry between the two halves. A soft metal binding strap is then passed through at least two of the pairs of the openings and bent over in a manner semi-permanently, to hold the two halves together and the glass tile securely therebetween.

The rear surface of each of the bracket halves is also foraminated with an array of cement gripping openings formed, in this example, by a punching operation leaving for each opening a ring of rearwardly directed cement gripping teeth about the periphery of the opening.

Further details of these and other novel features as well as additional objects and advantages of the invention will become apparent and be best understood from a consideration of the following description taken in connection with the accompanying drawing which is presented by way of illustrative example only and in which:

FIG. 1 is a rear perspective view of an example of a portion of a glass tile system constructed in accordance with the principles of the present invention;

FIG. 2 is a cross-sectional view of the structure shown in FIG. 1 taken along the lines 2—2 thereof;

FIG. 3 is an interior, frontal perspective view of a portion of a tile holding bracket, according to the invention;

FIG. 4 is a horizontal sectional view of a portion of a vertical wall to which is affixed an example of a glass tile system constructed in accordance with the principles of the present invention; and FIG. 5 is a rear perspective view of a portion of an example of the invention, which portion is alternative to that illustrated in FIG. 1.

With specific reference now to the figures in detail, it is stressed that the particulars shown are by way of example, and for purposes of illustrative discussion only, and are presented in the cause of providing what is believed to be the most useful and readily understood description of the principles and structural concepts of the invention. In this regard no attempt is made to show structural details of the apparatus in more detail than is necessary for a fundamental understanding of the invention, the description taken with the drawings making apparent to those skilled in the art how the several forms of the invention may be embodied in practice. Specifically, the detailed showing is not to be taken as a limitation upon the scope of the invention, which is defined by the appended claims forming, along with the drawings, a part of this specification.

Referring to FIG. 1, and collaterally to FIG. 2, an example of the invention is illustrated which includes a glass tile or tile body 10 which, in this example, is approximately square with a frontal surface 12, a rear surface 14, and four substantially equal in length edges 16, 18, 20, 22. Each of the edges are rearwardly beveled to form an undercut region 24, 26, 28, 30, respectively, rearwardly of the frontal surface 12. On each of at least two opposite edges, in this case edges 16, 20, a pair of retaining tabs 32, 34 and 36, 38, respectively, are formed integrally with the tile body portion 10. Each of the tabs 32, 34, 36, 38 is, therefore, made of glass and extends coplanarly with the rear surface 14 into the undercut regions 24, 28, respectively.

The length of the tabs is not critical as will be discussed in more detail below. However, for versatility in affixing an array of the tiles onto a supporting surface, it is preferable that they extend into the undercut regions but not beyond the perimeter of the plan projection of the frontal surface 12 of the tile body 10. It may be noted however, that while the undercut regions are furnished in this example by the rearward beveling of the tile body, these regions may be formed in any one of a variety of glass casting techniques. Similarly the retaining tabs may take a variety of forms without departing from the scope of the invention.

It may further be noted that an advantage of glass tiles is that the relatively small and relatively thin nature of the tabs, in whatever form they are provided by the artisan, are relatively strong because of the strength, inherently, of the vitrified material of which the tiles are cast.

Substantially jacketing the rear and edge portions of the glass tile body 10, is a bracket assembly 40 which includes a rear sheet metal surface 42 and forwardly inclined side portions 44, 46. The side portions extend forwardly along the beveled edges 16, 20, respectively, of the tile body toward but stopping short of the frontal surface 12.

Each of the side portions 44, 46 is foraminated to form a pair of openings 48, 50 and 52, 54, respectively, which are adapted to engage and through which are passed the retaining tabs 32, 34 and 36, 38, respectively. The bracket assembly 40 is divided along its center, in a line parallel to the side portions 44, 46, into a pair of bracket halves 56, 58 which are substantially mirror images of each other disposed about a line of symmetry which may be considered coincident with the line along which the bracket assembly is divided. Thus the bracket portions 56, 58 each have an edge 60, 62 which lies contiguous to the line of symmetry between the bracket halves.

A pair of spaced openings 64, 66 are formed in the rear sheet metal surface of the bracket half 56 contiguously to the edge 60. In an opposing relationship thereto, a similar pair of spaced openings 68, 70 are provided along the edge 62 of the bracket half 58. A tension supporting, metal tie strap 72, is passed through the opening 64 and 68 with its ends bent over as shown, in a manner to exert a pulling force on the bracket halves 56, 58 in a manner to hold them securely engaged with respect to the retaining tabs of the glass tile thereby securing the bracket halves to each other, and to the glass tile. Similarly and cooperatively therewith, a metal tie strap 74 is passed through the openings 66, 70 and secured.

Another set of foraminations is provided in the rear sheet metal surface 42 of each of the bracket halves 56, 58 in the form of an array of rearwardly punched frusto-conical mortar gripping openings 76.

In the utilization of the invention an optically isolating foil thin sheet member 80 may be placed over the rear surface 14 of the glass tile body portion 10, in a manner to screen fully the array of openings 76 and the bracket edges 60, 62 from frontal view through the glass tile. The sheet member 80 may be reflective for purposes of providing additional vividness of color to the glass tiles or may be absorptive to enhance the depth of color depending upon the transparency, color, and surface finish applied to the glass tile during its manufacture. It has been found to be advantageous to make the rear surface of the sheet member 80 waterproof so that it will not absorb moisture from the mortar with which it becomes in contact during its application to the supporting surface for the glass tiles. The interlocking engagement of the mortar gripping openings 76 is illustrated in a subsequent figure.

Referring to FIG. 3, one of the mirror image bracket halves 56 is shown in a frontal perspective view in a manner to emphasize its hollow pan-like configuration which is adapted to conform to the rear and side surfaces of the glass tile body portion 10. The bracket half 56 is seen to consist in this example, of the rear sheet metal surface 42 and the side portions 44 which are formed by bending the outer portions of the sheet metal forwardly at an angle to conform to the beveled edge of the tile body. The longer side portion is provided with the two openings 48, 50 for receiving the retaining tabs 32, 34. These openings are disposed contiguously to the junction of the side portion 44 with the rear sheet metal surface 42 along a line parallel to the edge 60 which, as described above, may be considered to be the axis of symmetry between two such bracket halves when affixed to a glass tile. The tie strap receiving openings 64, 66 are again shown as lying contiguously to the edge 60. The array of frusto-conical, rearwardly punched-out mortar gripping openings 76 are shown as they appear from their front, tile-engaging surface.

In FIG. 4 a horizontal sectional view of a portion of a vertical wall 82 is illustrated over which has been spread a layer of tile-supporting mortar 84. Two of the completed tile and bracket assemblies as shown in the previous figures are set into the mortar 84 in a manner whereby the mortar gripping opening 76 interlockingly engage with the material of the mortar 84. The two tiles 10 shown, have been applied to an external corner in the wall 82, in a manner to face that portion of the wall and the corner with glass tile. The illustrated spacing between the two tiles at their corner is deliberately maintained, as is customary practice, for purposes of holding a finishing and sealing grout material not shown.

An interior corner of the wall 82 may be covered with glass tile by utilizing a vertically elongated concave molding glass strip 86, a particular configuration of which is shown in perspective view in FIG. 5, to which reference is now made. In this example of the invention, the bracket assembly 88 is formed of two pieces having contiguous edges 90, 92, which are each mutually contiguous to the line or plane of symmetry between the two bracket halves 94, 96, formed thereby. The rear face, not shown, of the molding glass tile strip 86, is again planar, and rectangular, with integrally formed retaining tabs 98, 100, extending from the short rectangular edges of the rear surface of the tile, the short rectangular edges being those parallel to the edges 90, 92, of the bracket assembly.

Again the pan-like bracket halves are each provided with openings 102, 104, for receiving and engaging in an interlocking manner the retaining tabs 98, 110, and thereby securing the tile 86 and the bracket assembly in a unitary assembly. The tie strap receiving openings 106, 108, are, as in the previous example, provided in each respective half, near its edges 90, 92, and a metal tie strap 74 may be secured therethrough for purposes of holding the assembly as a unitary body both during its application to the mortar bed, as well as on a permanent basis thereafter. As before, the frusto-conically punched mortar gripping openings 76 interlockingly engage the mortar material.

Referring again to FIG. 4, an alternative form of the vertically elongated molding glass strip 86 is illustrated, which is designed to utilize the advantages of the bracket assembly of the previous examples of the invention, but which is particularly suitable for surfacing columns or other convexly contoured surfaces. This example of the invention may utilize the bracket assembly 88 of FIG. 5 to hold a vertically elongated convex molding glass tile strip 110. The edges and ends and rear surface of the glass tile strip 110 may be similar in all essential respects to that of the concave tile strip 86, the difference between the two being the convex outer surface of the molding glass tile strip 110. The latter embodiment, as may be inferred from the figure, is particularly suitable for terminating a panel of mosaically applied glass tiles along a wall other than at a corner.

The operation and utilization of the elongated molding glass tile strips 86, 110, are like that discussed above in connection with the example of the invention illustrated in FIG. 1, viz., the glass tile strip has a foil thin sheet member placed over its rear surface which is then placed within the pan-like assembly of a pair of bracket halves 94, 96. A bendable metal tie strap 74 is laced through the openings 106, 108, and bent over as indicated by the arrows 112 in FIG. 5 in a manner to hold the bracket halves securely locked onto the glass tile strip by means of the interlocking tabs 98, 100, and the tab receiving openings 102, 104. The entire composite assembly is then compressed into the moist mortar bed and positioned as desired by the tilesetter. The engagement of the frusto-conical mortar gripping openings with the mortar, causes the bracket members to be securely affixed permanently to the mortar bed when the mortar has become set.

There have thus been disclosed and described a number of examples of the glass tile system of the invention which achieve the objects and exhibit the advantages set forth hereinabove.

What is claimed is:

1. A glass tile system comprising:
a glass tile having front, rear, and edge surfaces, two of said edge surfaces being disposed along opposite parallel sides of said rear surface;
holding tab portions of said glass tile formed integrally therewith and extending outwardly from each of said two edge surfaces;
holding bracket means including a metal sheet portion juxtaposed contiguously over said rear surface of said glass tile and having edge portions affixed thereto substantially conforming to at least a portion of said two edge surfaces of said glass tile, said edge portions of said bracket means being formed to define openings therein receiving and holding said holding tab portions;
said holding bracket means being divided across said metal sheet portion along a line parallel to said edge portions;
tension supporting means securing the divided holding bracket means together in tile holding contact with said holding tab portions.

2. A glass tile system comprising:
a glass tile having front, rear, and edge surfaces, two of said edge surfaces being disposed along opposite parallel sides of said rear surface;
holding tab portions of said glass tile formed integrally therewith and extending outwardly from each of said two edge surfaces;
holding bracket means including a metal sheet portion juxtaposed contiguously over said rear surface of said glass tile and having edge portions affixed thereto substantially conforming to at least a portion of said two edge surfaces of said glass tile, said edge portions of said bracket means being formed to define openings therein receiving and holding said holding tab portions;
said holding bracket means being divided across said metal sheet portion along a line parallel to said edge portions;
tension supporting means securing the divided holding bracket means together in tile holding contact with said holding tab portions;
said metal sheet portion being foraminated in a manner to form a plurality of cement mortar gripping openings across at least a major portion of that part of its surface juxtaposed with respect to said rear surface of said glass tile.

3. A glass tile system comprising:
a glass tile having front, rear, and edge surfaces, at least two of said edge surfaces being disposed along opposite parallel sides of said rear surface, and being relieved inwardly to form edge surfaces undercut with respect to said front surface;
holding tab portions of said glass tile formed integrally therewith and extending outwardly from each of said two undercut edge surfaces;
holding bracket means including a metal sheet portion juxtaposed contiguously over said rear surface of said glass tile and having edge portions affixed thereto substantially conforming to at least a portion of said two undercut edge surfaces of said glass tile, said edge portions of said bracket means being formed to define openings therein receiving and holding said holding tab portions;
said holding bracket means being divided across said metal sheet portion along a line parallel to said edge portions;
tension supporting means securing the divided holding bracket means together in tile holding contact with said holding tab portions;
said metal sheet portion being foraminated in a manner to form a plurality of cement mortar gripping openings across at least a major portion of that part of its surface juxtaposed with respect to said rear surface of said glass tile.

4. The invention according to claim 3 in which each said holding tab portion is substantially coplanar with said rear surface of said tile and projects into the region of its associated said undercut edge laterally not more than to the perimeter of the planned projection of said front surface of said tile.

5. The invention according to claim 3 in which said tension supporting fastening means comprises a bendable metal tie strap and linkage means engaging each of the divided portions of said bracket means.

6. The invention according to claim 3 in which said cement gripping openings comprise an array of rearwardly directed, hollow frusto-conical stampings formed in said metal sheet.

7. The invention according to claim 3 in which said glass tile is substantially square and said holding bracket means is divided into substantially mirror image halves, each of which substantially jackets an associated half of said edge and rear surfaces of said glass tile.

8. The invention according to claim 3 in which said bracket means comprises a sheet metal, shallow pan-like jacket for substantially all of said rear and undercut edge portions of said glass tile.

9. The invention according to claim 3 in which said openings for receiving and holding said tab portions comprise substantially rectangular slots disposed contiguously parallel to the junction between said metal sheet portion and said edge portions.

10. The invention according to claim 3 which further includes a foil fin isolator sheet juxtaposed over said rear surface of said glass tile.

11. The invention according to claim 10 in which said isolator sheet is substantially waterproof and has an optically reflective surface disposed toward said glass tile.

References Cited by the Examiner

UNITED STATES PATENTS

| | | | |
|---|---|---|---|
| 1,856,030 | 4/1932 | Loeffler | 52—391 |
| 1,894,584 | 1/1933 | Fort | 52—391 |
| 1,935,584 | 11/1933 | Thurn | 52——307 |
| 1,970,759 | 8/1934 | Mattman | 52—307 X |
| 2,073,735 | 3/1937 | Duffy | 52—389 X |
| 2,251,840 | 8/1941 | Duffy | 52—391 |
| 2,259,718 | 10/1941 | Alexander | 52—307 X |
| 2,482,339 | 9/1949 | Hibbard et al. | 52—384 X |

FRANK L. ABBOTT, *Primary Examiner.*

M. O. WARNECKE, *Assistant Examiner.*